(12) United States Patent
Chen et al.

(10) Patent No.: US 6,804,594 B1
(45) Date of Patent: Oct. 12, 2004

(54) ACTIVE STEERING FOR HANDLING/STABILITY ENHANCEMENT

(75) Inventors: Hsien H. Chen, Troy, MI (US); John D. Martens, New Hudson, MI (US); Todd D. Brown, Brighton, MI (US); Ashok Chandy, Fenton, MI (US); Chester W. Gryczan, Brighton, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/402,570

(22) Filed: Mar. 28, 2003

(51) Int. Cl.[7] .............................. B62D 5/04; B62D 6/04
(52) U.S. Cl. ............................ 701/42; 701/41; 701/36; 701/48; 180/170; 180/6.2; 280/5.5
(58) Field of Search ............................ 701/42, 41, 36, 701/33, 48, 1; 180/170, 199, 204, 6.2; 280/5.5, 5.51

(56) References Cited

U.S. PATENT DOCUMENTS

| | | | | |
|---|---|---|---|---|
| 4,666,013 A | * | 5/1987 | Shibahata et al. | 180/421 |
| 4,949,262 A | * | 8/1990 | Buma et al. | 701/37 |
| 5,228,757 A | * | 7/1993 | Ito et al. | 303/146 |
| 5,267,160 A | * | 11/1993 | Ito et al. | 701/42 |
| 6,453,226 B1 | | 9/2002 | Hac et al. | 701/48 |
| 6,591,937 B2 | | 7/2003 | Badenoch et al. | |
| 2002/0042671 A1 | | 4/2002 | Chen et al. | 701/41 |
| 2003/0045978 A1 | | 3/2003 | Chandy | 701/36 |

* cited by examiner

*Primary Examiner*—Thomas G. Black
*Assistant Examiner*—Olga Hernandez
(74) *Attorney, Agent, or Firm*—Michael D. Smith (57) ABSTRACT

A control system for a steering system in a vehicle comprising: a reference model responsive to an operator input that computes desired states of the vehicle; a feedforward controller in operable communication with the reference model. The feedforward controller computes a first control value based on input from said reference model and based on at least one of: a lateral velocity, a rate of lateral velocity, a lateral acceleration, and a combination, wherein the combination includes a yaw rate with at least one of a lateral velocity, a rate of lateral velocity, and a lateral acceleration of the motor vehicle. The system also includes an actuator for affecting the steering system based on the first control value, the actuator in operable communication with the feedforward controller.

35 Claims, 6 Drawing Sheets

ACTIVE STEERING FOR HANDLING/STABILITY ENHANCEMENT

BACKGROUND OF THE INVENTION

The present invention relates to control systems for motor vehicle steering systems, and more particularly to a system and method including a dynamic feedforward feature for integrated control of the motor vehicle steering and brakes.

Unified or integrated chassis control systems have been proposed which control the brakes, steering, and suspension of a motor vehicle. The purpose of unified chassis control is to improve vehicle performance in all driving conditions by coordinating control of the chassis subsystems. Unified chassis control systems typically utilize a supervisory control concept that utilizes three fundamental blocks: a reference model, a state estimator, and a vehicle control. The vehicle control element normally incorporates a feedback control. This element computes control values by comparing actual states obtained from the state estimator with desired states from the reference model.

It is well known that when brakes are applied during a steering maneuver, a yaw rate error is induced. It such circumstances, the conventional chassis control systems are relatively slow to compensate.

SUMMARY OF THE INVENTION

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

Disclosed herein in an exemplary embodiment is a control system for a steering system in a vehicle comprising: a reference model responsive to an operator input that computes desired states of the vehicle; a feedforward controller in operable communication with the reference model. The feedforward controller computes a first control value based on input from the reference model and based on at least one of: a lateral velocity, a rate of lateral velocity, a lateral acceleration, and a combination, wherein the combination includes a yaw rate with at least one of a lateral velocity, a rate of lateral velocity, and a lateral acceleration of the motor vehicle. The system also includes a means for affecting the steering system based on the first control value, the means in operable communication with the feedforward controller.

Also disclosed herein is a method of controlling a steering system in a vehicle comprising: computing a desired state of the steering system; and computing a first control value based on the desired states of the steering system. The first control value is also computed based on at least one of: a lateral velocity, a rate of lateral velocity, a lateral acceleration, and a combination, wherein the combination includes a yaw rate with at least one of a lateral velocity, a rate of lateral velocity, and a lateral acceleration of the vehicle. The method further includes affecting the steering system based on the first control value.

Further disclosed herein is a control system for a steering system in a vehicle comprising: a means for computing a desired state of the steering system; a means for computing a first control value based on the desired state of the steering system and based on at least one of: a lateral velocity, a rate of lateral velocity, a lateral acceleration, and a combination. The combination includes a yaw rate with at least one of a lateral velocity, a rate of lateral velocity, and a lateral acceleration of the vehicle. The system further includes a means for affecting the steering system based on the first control value.

Also disclosed herein in yet another embodiment is a storage medium encoded with a machine-readable computer program code, the computer program code including instructions for causing a controller to implement the above mentioned method for controlling a steering system in a vehicle.

Further disclosed herein in yet another embodiment is a computer data signal, the data signal comprising code configured to cause a controller to implement the abovementioned method for controlling a steering system in a vehicle.

BRIEF DESCRIPTION OF THE DRAWINGS

The present invention will now be described, by way of an example, with references to the accompanying drawings, wherein like elements are numbered alike in the several figures in which.

DETAILED DESCRIPTION

Figure 1:
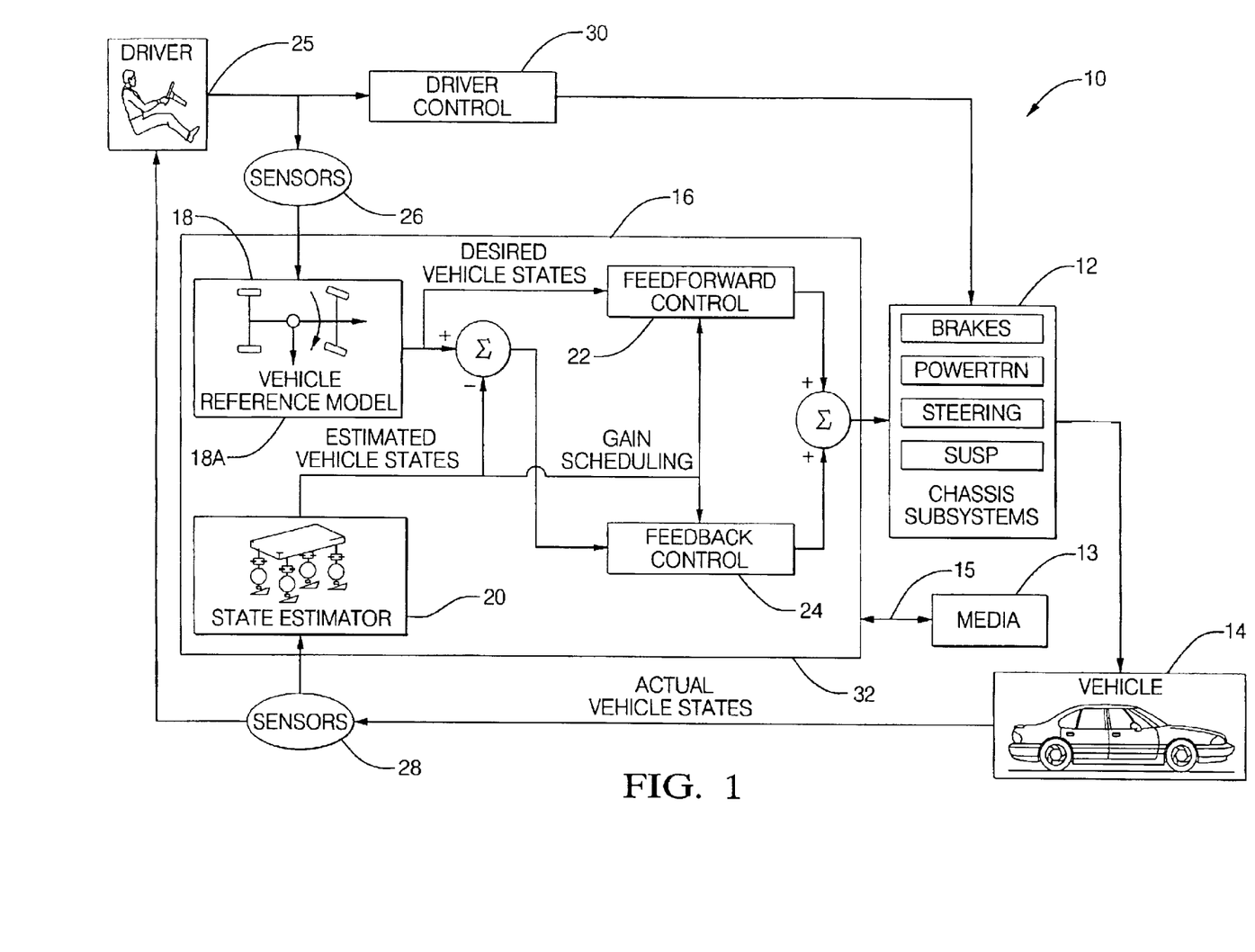
FIG. 1 is a simplified block diagram of a vehicle control system according to an exemplary embodiment.

FIG. 1 shows a control system 10 according to an exemplary embodiment for chassis subsystems 12 of a motor vehicle 14. The chassis subsystems may include front and/or rear steering and braking. The chassis subsystems further include sensors, actuation devices and the like for appling commands to the control system 10 and thereby controlling the vehicle 14. A controller 16 performs many estimation and control functions conventionally performed by the subsystems themselves. The controller 16 includes a reference model 18, an estimator 20 of vehicle state and environment, and a vehicle level controller including a feedforward controller 22 and a feedback controller 24.

The reference model 18 determines the desired vehicle response, in terms of measureable variables, to driver inputs 25 using measured inputs from sensors 26 and some estimates. For example, driver inputs may include, but not be limited to steering angle applied to a steering input device e.g., steering wheel, throttle, braking, selectable operating mode, e.g. two wheel steering, four wheel steering, trailering, and the like. In an exemplary embodiment, a driver input to a steering wheel is detected by a sensor 25 for utilization in controller 16 at reference model 18a to ascertain a desired steering command. The estimator 20 uses measured inputs such as from sensors 26, measured outputs such as from sensors 28, and some preliminary estimates from individual modules to generate estimates of vehicle states which are not measured directly. The estimator 20 may also estimate variables describing potentially relevant environmental effects such as surface coefficient of adhesion, bank angle of the road surface, roughness of the road surface, and others. Also disclosed herein in another exemplary embodiment is a method of throttle scheduling of the yaw rate gain in the computation of the desired yaw rate from the reference model 18a. Moreover, the throttle scheduling could similarly, be applied for lateral velocity.

In order to perform the prescribed functions and desired processing, as well as the computations therefore (e.g., the dynamic feedforward control, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed herein.

As exemplified herein and disclosed above one such process may be dynamic feed forward control. Controller 16 receives various input signals from sensors 26 including, but not limited to, those identified above, to facilitate such processing and may provide one or more output signals in response. The controller 16 uses the desired, measured and estimated values to determine the corrective action on the vehicle level, for example moments and forces acting on the vehicle, that will bring the vehicle response into conformance with the desired response. The controller 16 also performs partition of control among the subsystems 12. Thus, the controller 16 decides whether and to what extent to activate any subsystem(s) in a given situation.

The feedforward controller 22 computes a control value based on input from the reference model 18. An exemplary embodiment optionally provides a driver to chassis subsystem transfer function 30. In the case of steering, this could represent the transfer function between steering wheel position and road wheel position. In the case of braking, this could represent the transfer function between pedal force and caliper forces at each of the braked wheels of the motor vehicle. This transfer function can be included in the feedforward and feedback control design. It should be noted that the lines on the block diagram in FIG. 1 show primary control paths. In reality, due to the non-linear nature of vehicle dynamics, the present invention contemplates other links such as bank angle from the state estimator 20 to the feedforward controller 22. A control term based on the driver inputs (inputs to the reference model 18a) are also appropriate and fit the definition of feedforward control.

A dynamic feedforward (DFF) control as a function of vehicle yaw-plane dynamics was introduced in commonly owned copending U.S. patent application Ser. No. 09/935, 274, filed Aug. 22, 2001, the disclosures of which are incorporated by reference herein in their entirety. In that dynamic feed forward (DFF) control the reference model 18 was primarily responsive to vehicle yaw rate and ignored the effects of tire dynamics. While well suited for its intended purposes, this reference model included the potential for mathematical anomalies under certain conditions, diminishing the benefits of the reference model 18.

In an exemplary embodiment a dynamic feedforward control is introduced which expands the abovementioned reference model 18 and feedforward control 22 to enhance the control system 10 for rear wheel steering. The new reference model 18a and feed forward control 22a provides a solution based on vehicle yaw rate as described above, and lateral velocity. Additionally tire characteristics and dynamics have been added to the reference model 18a to refine the model and improve its integrity over a wider array of operational scenarios. It will be appreciated that as discussed herein, for continuity, clarity, and simplification of description, all references herein cite modeling and control based on lateral velocity. It is noteworthy to appreciate that the exemplary embodiments disclosed herein are equally applicable utilizing similar dynamic vehicle parameters including, but not limited to rate of lateral velocity and lateral acceleration.

Continuing with the dynamic feed forward control 22, in an exemplary embodiment, a linear blend of the two solutions within the feedforward control 22a for vehicle yaw rate and lateral velocity over a selected range of hand wheel spectral content. The selected range is defined by a selected lower threshold and a selected upper threshold. For hand wheel frequencies less than the lower threshold, the dynamic feedforward control based on yaw rate is employed, and for hand wheel frequencies above the upper threshold, the dynamic feedforward control based on later velocity is used. For frequencies between the selected upper and lower thresholds a blend to the reference model solutions based on yaw rate and lateral velocity is employed. It will be appreciated that at low hand wheel angle frequencies, the vehicle dynamics are more appropriately modeled based on yaw rate response, while for higher frequency hand wheel angle inputs the vehicle dynamics are more appropriately modeled based on lateral velocity.

Figure 2:
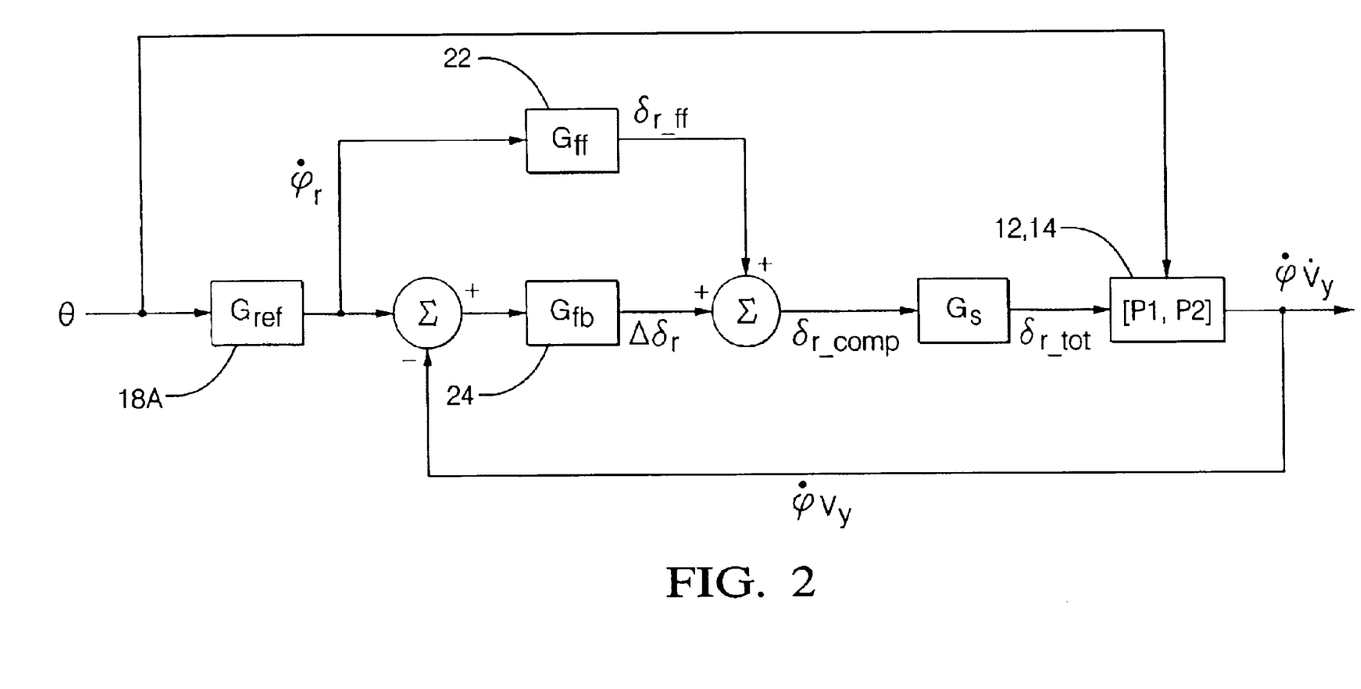
FIG. 2 is a block diagram a block diagram representation of a control system including a reference model and the dynamic feed forward control system using a multi-order reference model.

In yet another exemplary embodiment, another blending methodology is disclosed. A linear blend of the output from a direct front-to-rear wheel angle transfer function to the dynamic feedforward front-to-rear wheel angle transfer function over a selected speed range is employed. Finally, throttle scheduling of the yaw rate gain (and/or the lateral velocity gains) in the computation of the desired yaw rate from the reference model 18a is depicted, Turning now to FIG. 2 as well, a block diagram representation of the controls system 10 is depicted The yaw rate shown above is given by:

$$\phi = P_1\theta + P_2 G_S[G_{ff}\phi_r + G_{fh}(\phi - \phi_r)] \qquad (1)$$

where $P_1$ is the portion of the vehicle plant modeling the front wheel steering response;

$P_2$ is the portion of the vehicle plant modeling the rear wheel steering response;

$\theta$ is the front wheel angle (proportional to hand wheel or steering wheel angle);

$G_S$ is a transfer function modeling actuators;

$G_{ff}$ is the dynamic feed forward control; and $\phi_r$ is the desired yaw rate from the reference model 18a.

Let us assume the yaw rate is equal to the desired yaw rate as:

$$\phi = \phi_r \qquad (2).$$

Substituting (2) into (1) yields:

$$(1 - P_2 G_S G_{ff})\phi_r = P_1\theta \qquad (3).$$

Let us assume:

$$\phi_r = G_{ref}\theta \quad (4).$$

Substituting (4) into (3) yields:

$$(1-P_2 G_S G_{ff})G_{ref}\theta = P_1\theta \quad (5).$$

Rearranging (5), the general dynamic feed-forward transfer function is given by:

$$G_{ff} = P_2^{-1} G_S^{-1}[1 - G_{ref}^{-1} P_1] \quad (6)$$

where $P_1$ represents the transfer function to relate the yaw rate to the front road wheel and is given by:

$$P_1 = \frac{\varphi}{\theta} = \frac{P_1(z)}{P(p)}. \quad (7)$$

The transfer function to relate the yaw rate to the rear wheel angle is expressed as:

$$P_2 = \frac{\varphi}{\delta_r} = \frac{P_2(z)}{P_2(p)}. \quad (8)$$

DFF Control Based on Yaw Rate

Once again, referring back to FIG. 2, the rear wheel steer command is given by:

$$\delta_{r\_\varphi} = G_{ref} G_{ff}\theta = \frac{G_{ref}(z)P_1(p) - G_{ref}(p)P_1(z)}{G_{ref}(p)P_2(z)}\theta \quad (9)$$

where the $G_{ref}$ represents (in this instance) the desired yaw rate and is assumed to be a 2 zero, 4 pole (2Z4P) transfer function expressed as:

$$G_{ref} = \frac{G_{ref}(z)}{G_{ref}(p)} = k_d \frac{\omega_1^2 \omega_2^2}{\omega_3^2} \frac{(s^2 + 2\zeta_3 \omega_3 s + \omega_3^2)}{(s^2 + 2\zeta_1 \omega_1 s + \omega_1^2)(s^2 + 2\zeta_2 \omega_2 s + \omega_2^2)}. \quad (10)$$

The transfer functions $P_1(z)$, $P_2(z)$, $P_1(p)$ shown in equation 9 may readily be determined from a bicycle model including tire relaxation at the front and rear tires as a function of such vehicle parameters as vehicle mass M, vehicle speed $V_x$, vehicle yaw inertia $I_z$, front and rear cornering stiffness $c_f$, $c_r$, and tire relaxation length at the front and rear axle $L_f$, $L_r$, respectively The DFF rear wheel control command (based on desired yaw rate) is determined by substituting equations (10) and (11) into equation 9, which yields:

$$\delta_{r\_\varphi} = \frac{m_1 s^6 + m_2 s^5 + m_3 s^4 + m_4 s^3 + m_5 s^2 + m_6 s + m_7}{l_1 s^6 + l_2 s^5 + l_3 s^4 + l_4 s^3 + l_5 s^2 + l_6 s + l_7} \quad (11)$$

where the $m_i$ and $l_i$ are functions of the vehicle parameters and states.

DFF Control Based on Lateral Velocity

Similarly, once again from FIG. 2, the rear wheel steer command is given by;

$$\delta_{r\_vy} = G_{ref\_vy} G_{ff\_vy}\theta = \frac{G_{ref\_vy}(z)P_1(p) - G_{ref}(p)P_{1\_vy}(z)}{G_{ref}(p)P_{2\_vy}(z)}\theta \quad (12)$$

where the $G_{ref\_vy}$ represents in this instance, the desired lateral velocity and is assumed to be (in this instance) a 2 zero, 4 poles (2Z4P) transfer function expressed as:

$$G_{ref\_vy} = \frac{G_{ref\_vy}(z)}{G_{ref}(p)} = k_{d\_vy} \frac{\omega_1^2 \omega_2^2}{\omega_4^2} \frac{(s^2 + 2\zeta_4 \omega_4 s + \omega_4^2)}{(s^2 + 2\zeta_1 \omega_1 s + \omega_1^2)(s^2 + 2\zeta_2 \omega_2 s + \omega_2^2)}. \quad (13)$$

Once again, the transfer function $P_{1\_vy}(z)$, $P_{2\_vy}(z)$ shown in equation 12 may readily be determined from a bicycle model including tire relaxation at the front and rear tires as a function of such vehicle parameters as vehicle mass M, vehicle speed $V_x$, vehicle yaw inertia $I_z$, front and rear cornering stiffness $c_f$, $c_r$, and tire relaxation length at the front and rear axle $L_f$, $L_r$, respectively. Hence, the DFF rear wheel control command (based on desired lateral velocity) is determined by substituting equation (13) into equation (12), which yields:

$$\delta_{r\_vy} = \frac{n_1 s^6 + n_2 s^5 + n_3 s^4 + n_4 s^3 + n_5 s^2 + n_6 s + n_7}{q_1 s^6 + q_2 s^5 + q_3 s^4 + q_4 s^3 + q_5 s^2 + q_6 s + q_7}\theta \quad (14)$$

where $n_i$ and $q_i$ are functions of the vehicle parameters and states.

Blend of Dynamic Feedforward Solutions

As disclosed earlier in exemplary embodiment, a linear blend of the two dynamic feedforward solutions for vehicle yaw rate and lateral velocity may be employed. The blend may be over a selected range of hand wheel spectral content and/or based on selected weighting. In a first embodiment, the blending is a function of a weighting applied to each solution formulating a composite. The dynamic feed forward rear wheel control may be computed as:

$$\delta_{r\_ff} = \epsilon \delta_r + (1-\epsilon)\delta_{r\_vy} \quad (15).$$

where $\epsilon$ (range between 0 and 1) is the weighting on either yaw rate based or lateral velocity based dynamic feedforward control.

In yet another exemplary embodiment, the composite dynamic feedforward rear wheel control may be a computed as a function of steering frequency input.

$$\delta_{r\_ff} = G_{filt}\delta_r + (1-G_{filt})\delta_{r\_vy} \quad (16).$$

where in one embodiment $$G_{filt} = \frac{1}{\frac{s}{\omega_{filt}} + 1}$$

and $\omega_{filt}$=blend time constant.

For hand wheel frequencies less than a lower threshold, the dynamic feedforward control based on yaw rate is employed, and for hand wheel frequencies above an upper threshold, the dynamic feedforward control based on lateral velocity is used. For frequencies between the selected upper and lower thresholds a blend to the reference model solutions based on yaw rate and lateral velocity is employed. It will be appreciated that at low hand wheel angle frequencies, the vehicle dynamics are more appropriately modeled based on yaw rate response, while for higher frequency hand wheel angle inputs the vehicle dynamics are more appropriately modeled based on lateral velocity.

Figure 3:
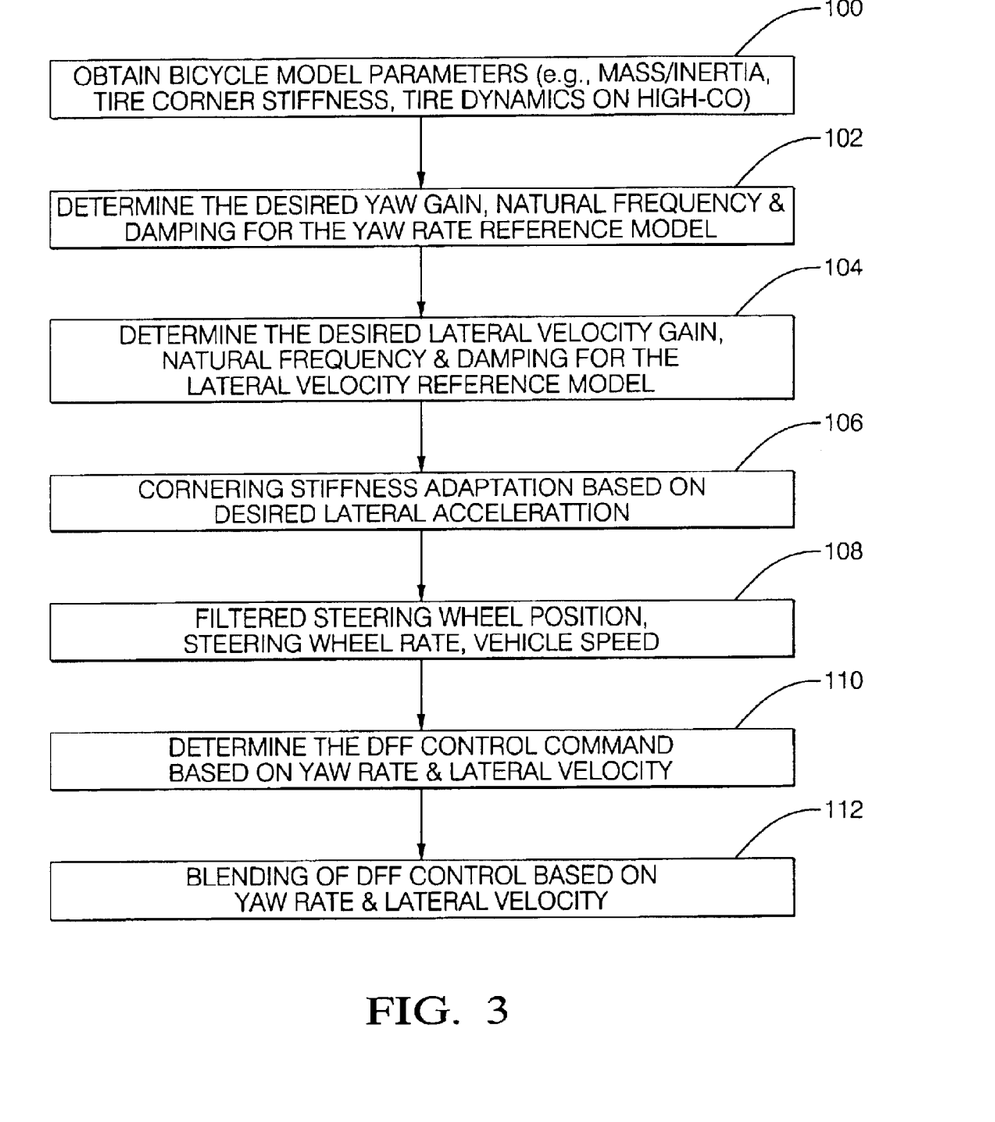
FIG. 3 is a flow chart depicting an exemplary embodiment of the methodology for computing dynamic feedforward control including blending.

FIG. 3 shows a dynamic feedforward control method for a rear steer application including a multi-order transfer function responsive to both vehicle yaw rate and lateral velocity. The bicycle model parameters are first obtained at block 100, and then at block 102 the desired yaw rate gain, natural frequency and damping are determined according to the desired tuning as discussed previously. At block 104 the desired lateral velocity gain, natural frequency and damping are determined according to the desired tuning. A cornering stiffness adaptation based on the desired steady state lateral acceleration is then performed at 106, followed by filtering the steering wheel position, the steering wheel rate, and the vehicle speed as shown by block 108. The dynamic feedforward control commands based on vehicle yaw rate and lateral velocity is then determined at block 10. At block 112 a blend process based on the frequency content of the hand wheel angle is employed to provide a blended dynamic feedforward control command based on either yaw rate lateral velocity, or a blended combination thereof.

Vehicle Speed Blending

Figure 6:
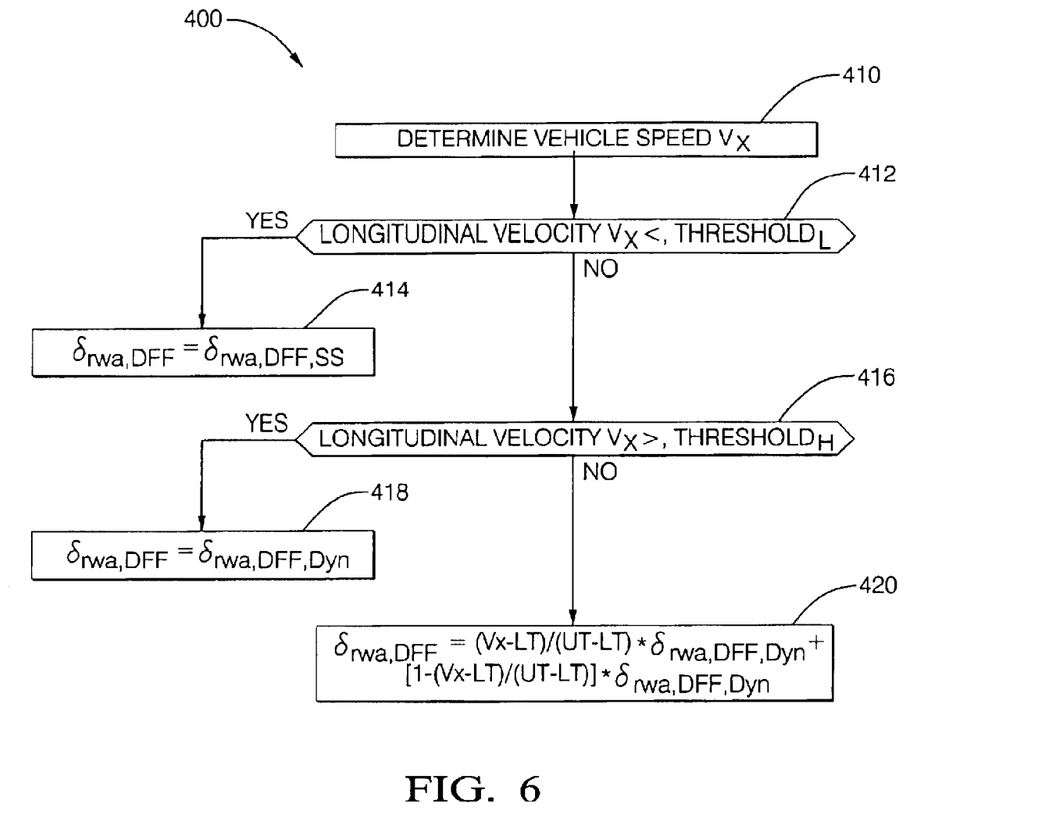
FIG. 6 is a flow chart depicting an exemplary embodiment of the methodology for computing velocity blending of an exemplary embodiment.

Referring now to FIG. 6, in yet another exemplary embodiment, another blending methodology 400 is disclosed. A linear blend of the output from a direct front-to-rear wheel angle transfer function to the dynamic feedforward front-to-rear wheel angle transfer function over a selected speed range is employed. The selected speed range is defined by a selected lower threshold, denoted $V_{X\_THRESH\_L}$ and a selected upper threshold, denoted $V_{X\_THRESH\_U}$. For vehicle speeds, $V_x$ less than the lower threshold, $V_{X\_THRESH\_L}$ the direct relationship is used, and for vehicle speeds $V_x$ above the upper threshold, $V_{X\_THRESH\_U}$ the dynamic feedforward relationship is used. In calculating the direct relationship, the desired steady-state yaw gain from the dynamic feedforward tuning is maintained while the dynamics are disregarded. It will be appreciated that at low speeds, the equations describing the dynamics in the reference model 118A are less robust and may produce unwanted effects in the vehicle.

The blending process of an exemplary embodiment is accomplished as follows:

Denote the front wheel steering angle as $\delta_{fwa}$ and note that it may be linearly approximated from the hand wheel angle, $\delta_{hwa}$, as $\delta_{fwa}=\delta_{hwa}/G_r$ where $G_r$ is the gear ratio from hand wheel to road wheel in the vehicle 14. The rear wheel angle output from the dynamic feedforward algorithm is given as a function the front wheel angle $\delta_{fwa}$ and the desired tuning as suggested by:

$$\delta_{r\_ff,DFF,Dyn}=f_{DFF}(\delta_{fwa}, \text{Tuning, vehicle state}) \quad (17)$$

where $f_{DFF}$ may be a 6th order transfer function (in one implementation) that depends on a vehicle model, vehicle parameters, vehicle state, and desired tuning.

More specifically, the dynamic feedforward transfer function from hand wheel to rear wheel angle is given by a steady-state relationship:

$$\delta_{r\_ff,DFF,SS}=(1-K_m)*\delta_{fwa} \quad (18)$$

where is $K_m$ is a yaw-gain multiplier, a variable in the tuning set. It will be appreciated that such a linear, non-dynamic transfer function is similar to the ratio employed in existing rear and four-wheel steering systems.

Thus, to respect this relationship and yet remove the dynamics, the feedforward transfer functions are divided. The steady-state portion of the transfer function from equation (17) is used at low vehicle speed while the dynamic transfer function (17) is used at medium and high speeds with blending performed in the intermediate speeds. That is, for an exemplary embodiment, where $V_x$=vehicle speed, LT=lower threshold, and UT=upper threshold, the following rule is formulated and applied:

$$\delta_{r\_ff,DFF} = \delta_{r\_comp,DFF,SS} \quad (19a)$$
for: $V_x < LT$;

$$\delta_{r\_ff,DFF} = (V_x - LT)/(UT - LT)*\delta_{r\_ff,DFF,Dyn} + \quad (19b)$$
$$[1-(V_x-LT)/(UT-LT)]*\delta_{r\_ff,DFF,SS}$$
for: $LT < V_x < UT$; and $$\delta_{r\_ff,DFF} = \delta_{r\_ff,DFF,Dyn} \quad (19c)$$
for: $V_x > UT$.

Continuing now with FIG. 6, the methodology 400 will now be described. In an exemplary embodiment, at block 410 the vehicle speed $V_x$ is determined. As will be appreciated the vehicle speed may be determined from a variety of sensors including, but not limited to, wheel speed sensors, drive train sensors, transmitting sensors, e.g. radar, Doppler, laser, and the like as well as combinations including at least one of the foregoing. At decision block 412 a determination is made as to whether the vehicle speed, $V_x$ is less than the lower threshold, $V_{X\_THRESH\_L}$. If so, the rear wheel control is computed based upon the steady state transfer function (equation 19a) as depicted at block 414. Otherwise, the method 400 continues to decision block 416 to determine if the vehicle speed, $V_x$ exceeds than the upper threshold, $V_{X\_THRESH\_U}$. If so, the rear wheel control is computed based upon the dynamic transfer function (equation 21c) as depicted at block 418. Otherwise, the method 400 continues to block 420 to where the rear wheel control is computed based upon the blended dynamic transfer function (equation 19b). It will be appreciated, that the blending disclosed herein, while described in terms of the dynamic feed forward control could also be utilized in the other control processes. For example, similar blending may be employed in the closed loop feedback control 24.

Throttle Scheduling

Figure 5:
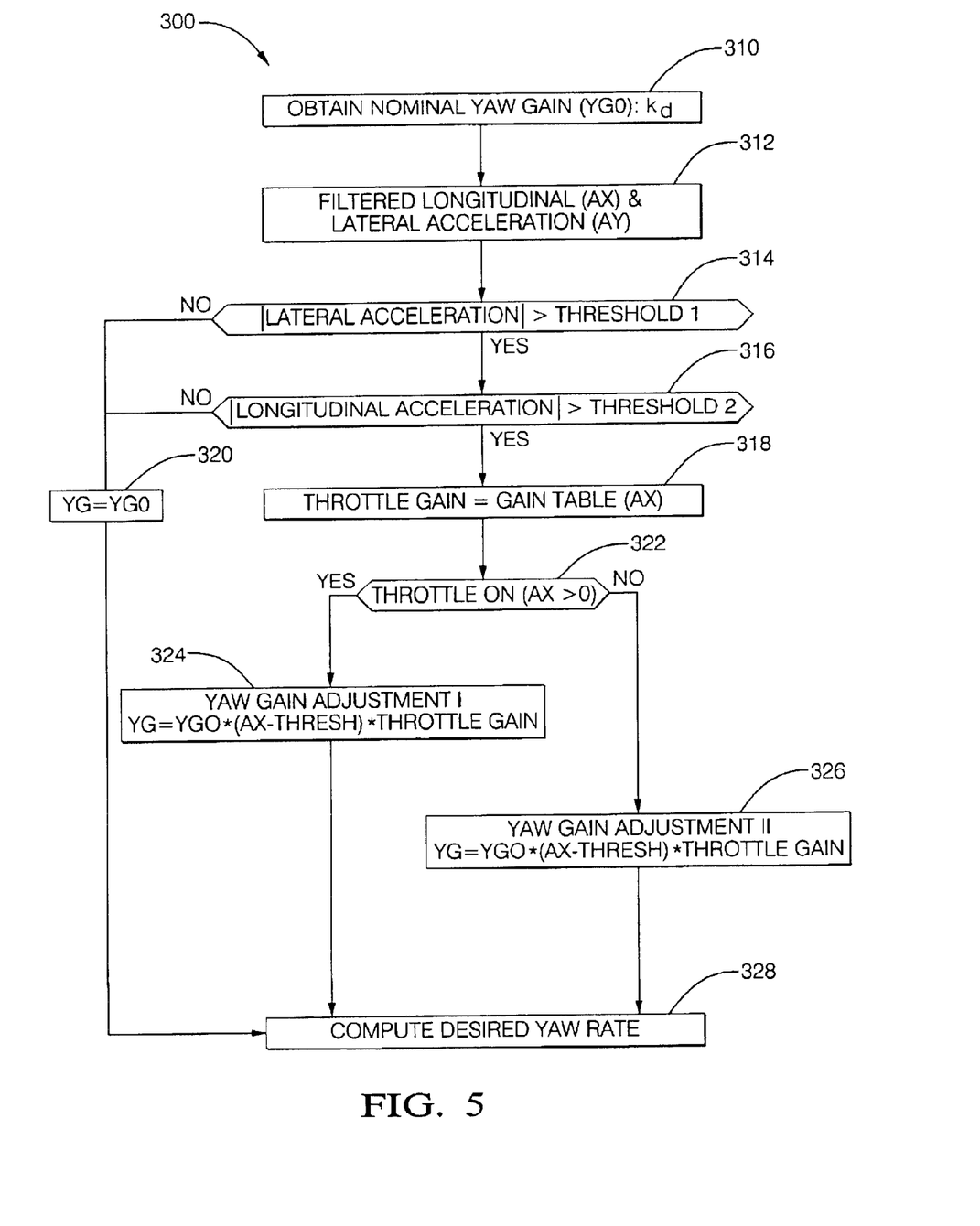
FIG. 5 is a flow chart depicting an exemplary embodiment of the methodology for computing throttle scheduling.

Turning now to FIG. 5, in yet another exemplary embodiment, a methodology 300 of throttle scheduling of the yaw rate gain in the computation of the desired yaw rate from the reference model 18A is depicted. It will be appreciated that while the embodiment disclosed herein is described in terms of yaw rate gain, the methodology is also applicable to lateral velocity. In an exemplary embodiment the method is initiated by obtaining the nominal yaw rate gain denoted in the equations as $k_d$ as depicted at block 310. At block 312 the longitudinal acceleration, denoted $A_x$ and lateral acceleration, denoted $A_y$ are acquired. In an exemplary embodiment, the accelerations are measured with onboard sensors and signals therefrom filtered. Continuing with blocks 314 and 316 if the magnitude of the lateral acceleration, $A_y$, and longitudinal acceleration, $A_x$ exceed a selected first and second threshold, then methodology transitions to block 318 for computation of the throttle gain. Otherwise, if the magnitude of either the longitudinal, $A_x$ or lateral acceleration $A_y$ is less than the selected first or second threshold, then the yaw rate gain is maintained at the nominal value as depicted at block 320. At block 318 a throttle gain is established as a function of the longitudinal acceleration $A_x$. In an exemplary embodiment a look up table is employed to establish the throttle gain, however other implementations are readily conceivable. At block 322 the sign of the longitudinal acceleration $A_x$ is determined. It will be appreciated that in an exemplary embodiment, a positive longitudinal acceleration, $A_x$ is indicative of the application of throttle (depending on sign convention), while a negative longitudinal acceleration, $A_x$ is indicative of reduction or removal of throttle. At blocks 324, and 326 the yaw gain is scheduled as a function of the nominal yaw gain, throttle gain, a selected threshold, and the longitudinal acceleration, $A_x$. Finally, at block 328 the computation of the desired yaw rate is depicted, in this embodiment including scheduling as a function of the throttle.

Closed-Loop Control

Continuing with FIG. 1 and FIG. 2 and turning now to the closed loop control and specifically the feedback control 24. In an exemplary embodiment of the control system 10 the feedback is enhanced to include closed loop control based on pole placement. A second order transfer function to relate the yaw rate to the rear-wheel steer control is given by:

$$P_2 = \frac{\varphi}{\Delta\delta_r} = \frac{b_{rl}s + a_{12}b_{r2} - a_{22}b_{rl}}{s^2 - (a_{11} + a_{12})s + a_{11}a_{22} - a_{12}a_{21}} \quad (20)$$

where $$a_{11} = \frac{-(a^2C_f + b^2C_r)}{I_z V_x}$$

$$a_{12} = \frac{-aC_f + bC_r}{I_z V_x}$$

$$a_{21} = \frac{-aC_f + bC_r}{MV_x} - V_x$$

$$a_{22} = \frac{-(C_f + C_r)}{MV_x}$$

$$b_{rl} = \frac{-bC_r}{I_z}.$$

Once again, from FIG. 2, assume the yaw rate feedback control transfer function $G_{fb}$, can express as a proportional and a derivative term associated with the yaw rate error $$G_{fb} = K_p + K_d s \quad (21).$$

The closed-loop transfer function of the system P, subjected to yaw rate feedback control is:

$$\frac{C(s)}{R(s)} = \frac{K_d b_{rl} s^2 + [\eta K_d + K_p b_{rl}]s + \eta K_p}{(1 + K_d b_{rl})s^2 +} \quad (22)$$

$$[-a_{11} - a_{22} + K_d \eta + K_p b_{rl}]s + \lambda + K_p \eta$$

Using the pole placement design method, the proportional gain $K_p$ and derivative control gain $K_d$ are respectively expressed as:

$$K_p = \frac{(1 + K_d b_{rl})\omega_n^2 - \lambda}{\eta} \quad (23)$$

$$K_d = \frac{(2\zeta_n \omega_n + a_{11} + a_{22}) + \frac{b_{rl}(-\omega_n^2 + \lambda)}{\eta}}{-2\zeta_n \omega_u b_{rl} + \eta + \frac{b_{rl}^2 \omega_n^2}{\eta}}$$

where:

$$\eta = a_{12}b_{r2} - a_{22}b_{r1}$$

$$\lambda = a_{11}a_{22} - a_{12}a_{21}.$$

The tire cornering stiffness at the front and rear are functions of the desired steady-state lateral acceleration and the surface friction estimation. The cornering stiffness (y-axis) reduces as the desired steady-state lateral acceleration increases (x-axis). Furthermore, the proportional and derivative gains increase when the surface friction reduces.

The closed-loop yaw rate feedback control for the steer control is the summation of the proportional, derivative, and a "window" integral term with saturation. The final closed-loop control command includes the contribution from the yaw rate and lateral velocity feedback.

Figure 4:
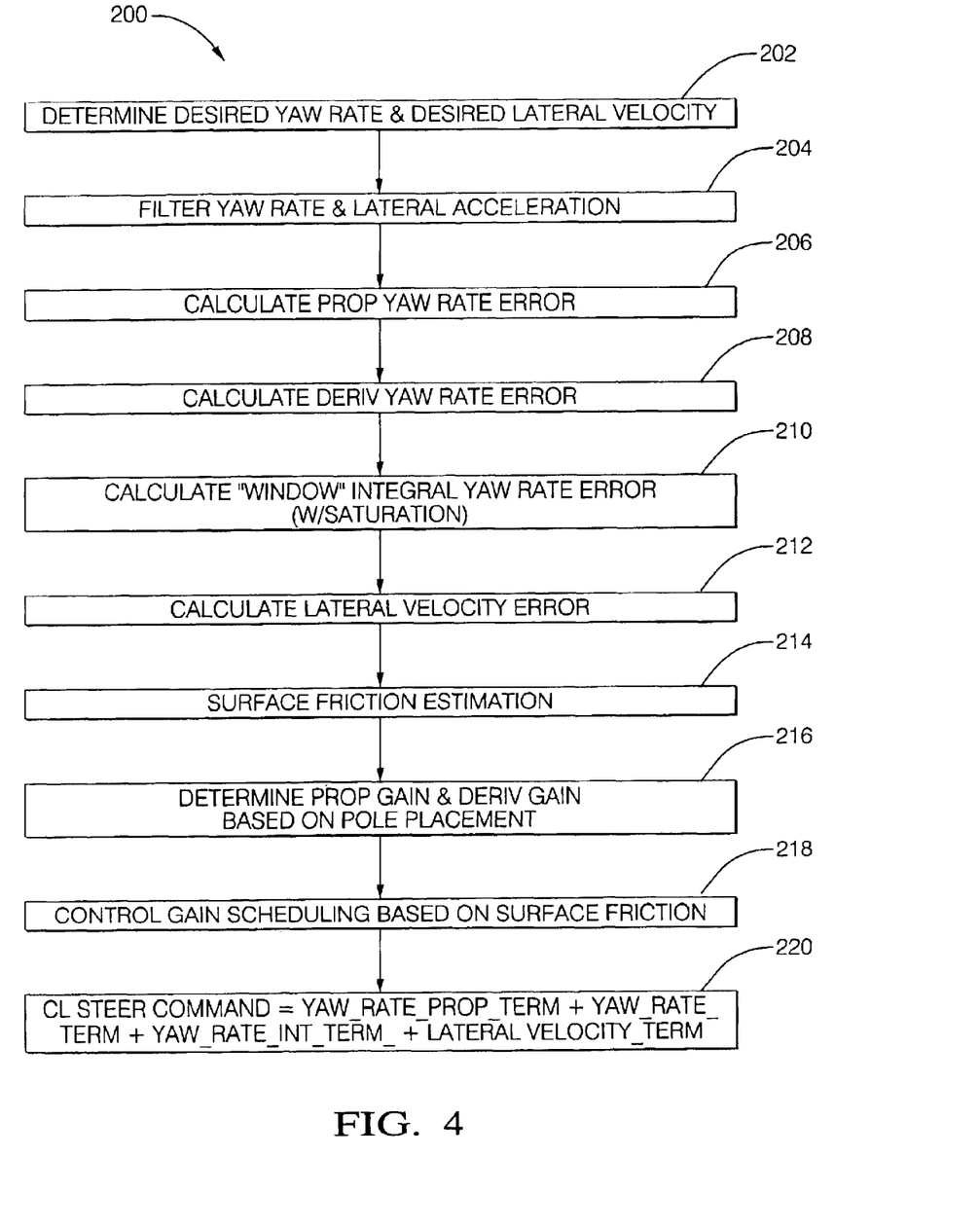
FIG. 4 is a flow chart depicting an exemplary embodiment of the methodology for computing closed loop control with pole placement.

Turning now to FIG. 4, a simplified flowchart depicting an exemplary implementation of a method 200 for closed loop feedback control in a rear wheel steering system. The method 200 initiates with a determination of a desired yaw rate and a desired lateral velocity. In an exemplary embodiment, these are based on the reference model 18$a$ as described with the equations above as depicted at block 202. The method continues with the measurement and processing of the actual vehicle parameters as shown and 204. Based on the desired and measured parameters values, errors are computed. In an exemplary embodiment, an error is computed for the yaw rate as well as the derivative of yaw rate as shown at blocks 206 and 208 respectively. In addition, at block 210 an integral of the yaw rate is computed employing well-known windowing techniques. The windowing provides a means of approximating an integral, while preventing excessive errors from accumulating. Moreover, in yet another exemplary embodiment, the window duration may be a function of vehicle speed.

Continuing with FIG. 4 the lateral velocity error is calculated at block 212. At block 214 a surface friction estimation is preformed to determine the coefficient of friction of the road surface. At block 216 a proportional, and derivative gain are computed employing a pole placement technique, to compute the desired gains that will provide desired performance and meet performance requirements. For example, the gains may be computed to stabilize the rear wheel control system and provide a selected response characteristic such as overshoot, steady state error, settling time and the like, as well as combinations including at least one of the foregoing. In an exemplary embodiment a pole placement methodology is employed to solve the control equations and determine the requisite gains, however, it will be appreciated that other control system solution methodologies may be employed.

Continuing once again with FIG. 4, and turning now to block 218, where the control gains may now be scheduled based on surface friction. In an exemplary embodiment, the scheduling provides a means of manipulating the feedback gains as the road surface adhesion varies. Such an approach facilitates maintaining vehicle dynamic response and stability over a wide array of operating conditions. Finally, at block 220 the closed loop steering command, denoted $\Delta\delta_r$, is formulated based on the proportional, integral and derivative yaw rate terms and the rate of lateral velocity.

Continuing now with discussion of the characteristics of the closed loop control 24, it will also be appreciated that the vehicle's natural frequency and damping ratio are preferably decreased as the vehicle speed is increased. An advantage of the multi-order transfer function is that it allows a driver to choose a desired handling characteristic of a vehicle by tuning vehicle-speed-dependent parameters of the reference models.

Continuing now with FIGS. 1 and 2, the composite rear steering control command denoted $\delta_{r\_comp}$ is the summation of the dynamic feedforward control $\delta_{r\_ff}$, and the feedback or closed loop control denoted $\Delta\delta_r$. This composite rear wheel steering command may be applied to one addition transfer function denoted $G_S$. The transfer function $G_S$ is optionally introduced for modeling actuators separately. In an exemplary embodiment, it provides a simple gain. Continuing with the figure, the total rear steer control command denoted $\delta_{r\_tot}$ is applied to the plants as described above.

The disclosed invention can be embodied in the form of computer or controller implemented processes and apparatuses for practicing those processes. The present invention can also be embodied in the form of computer program code containing instructions embodied in tangible media 13, such as floppy diskettes, CD-ROMs, hard drives, or any other computer-readable storage medium, wherein, when the computer program code is loaded into and executed by a computer or controller, the computer becomes an apparatus for practicing the invention. The present invention may also be embodied in the form of computer program code as a data signal 15, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A control system for a steering system in a vehicle comprising:

a reference model responsive to an operator input and tire relaxation, which computes desired states of the vehicle;

a feedforward controller in operable communication with said reference model, said feedforward controller computes a first control value based on input from said reference model and based on at least one of: a lateral velocity, a rate of lateral velocity, a lateral acceleration, and a combination, wherein said combination includes a yaw rate with at least one of a lateral velocity, a rate of lateral velocity, and a lateral acceleration of said motor vehicle; and an actuator for affecting the vehicle based on said first control value, said actuator in operable communication with said feedforward controller.

2. The control system of claim 1 further comprising a state estimator, said state estimator estimates an actual state of said vehicle.

3. The control system of claim 2 further comprising a feedback controller, said feedback controller computes a second control value by comparing said estimate of actual state with a desired state.

4. The control system of claim 3 wherein said feedback controller computes a blended solution for said second control value based on a vehicle velocity.

5. The control system of claim 3 wherein:

said second control value is based on said yaw rate if a vehicle velocity is below a selected threshold;

said second control value is based on said at least one of a lateral velocity, a rate of lateral velocity, and a lateral acceleration of said vehicle if said vehicle velocity is above a selected threshold; otherwise said second control value is based on a combination of said yaw rate said at least one of a lateral velocity, a rate of lateral velocity, and a lateral acceleration of said vehicle.

6. The control system of claim 1 wherein said reference model computes said desired state for the vehicle based on a magnitude of a lateral acceleration and at least one of a throttle command and a magnitude of a longitudinal acceleration.

7. The control system of claim 1 wherein said desired state for the vehicle includes at least one of a desired yaw rate, a desired lateral velocity, a desired rate of lateral velocity, and a desired lateral acceleration for said vehicle.

8. The control system of claim 1 wherein said first control value is based on at least one of a vehicle speed, a steering wheel position, and vehicle tire dynamics.

9. A control system for a steering system in a vehicle comprising:

a reference model responsive to an operator input which computes desired states of the vehicle;

a feedforward controller in operable communication with said reference model, said feedforward controller computes a first control value based on input from said reference model and based on at least one of: a lateral velocity, a rate of lateral velocity, a lateral acceleration, and a combination, wherein said combination includes a yaw rate with at least one of a lateral velocity, a rate of lateral velocity, and a lateral acceleration of said motor vehicle;

an actuator for affecting the vehicle based on said first control value, said actuator in operable communication with said feedforward controller; and wherein said feedforward controller computes a blended solution for said first control value based on a steering wheel frequency.

10. The control system of claim 1 wherein:

said first control value is based on said yaw rate if a steering wheel frequency is below a selected threshold;

said first control value is based on said at least one of a lateral velocity, a rate of lateral velocity, and a lateral acceleration of said vehicle if said steering wheel frequency above a selected threshold; otherwise said first control value is based on a combination of said yaw rate said at least one of a lateral velocity, a rate of lateral velocity, and a lateral acceleration of said vehicle.

11. The control system of claim 1 wherein said feedforward controller computes a blended solution for said first control value based on a vehicle velocity.

12. A control system for a steering system in a vehicle comprising:

a reference model responsive to an operator input which computes desired states of the vehicle;

a feedforward controller in operable communication with said reference model, said feedforward controller computes a first control value based on input from said reference model and based on at least one of: a lateral velocity, a rate of lateral velocity, a lateral acceleration, and a combination, wherein said combination includes a yaw rate with at lest one of a lateral velocity, a rate of lateral velocity, and a lateral acceleration of said motor vehicle;

an actuator for affecting the vehicle based on said first control value, said actuator in operable communication with said feedforward controller; and wherein said first control value is based on said yaw rate if a vehicle velocity is below a selected threshold;

said first control value is based on said at least one of a lateral velocity, a rate of lateral velocity, and a lateral acceleration of said vehicle if said vehicle velocity is above a selected threshold; otherwise said first control value is based on a combination of said yaw rate said at least one of a lateral velocity, a rate of lateral velocity, and a lateral acceleration of said vehicle.

13. The control system of claim 3 wherein said second control value is based on an estimate of surface friction.

14. The control system or claim 3 wherein at least one of said first control value and said second control value is based on a transfer function of order greater than two.

15. The control system of claim 3 wherein said second control value is a function of proportional, derivative, and a windowed integrator terms.

16. The control system of claim 1 wherein the vehicle is at least one of a rear wheel steering system and a front wheel steering system.

17. A method of controlling a steering system in a vehicle comprising:

computing a desired state of the vehicle based on tire relaxation;

computing a first control value based on said desired states of the vehicle and based on at least one of: a lateral velocity, a rate of lateral velocity, a lateral acceleration, and a combination, wherein said combination includes a yaw rate with at least one of a lateral velocity, a rate of lateral velocity, and a lateral acceleration of said vehicle;

affecting the vehicle based on said first control value.

18. The method of claim 17 further comprising estimating an actual state of said vehicle with a state estimator.

19. The method of claim 18 further comprising computing a second control value by comparing said estimate of an actual state with a desired state.

20. The method of claim 19 wherein said computing includes a blended solution for said second control value based on a vehicle velocity.

21. The method of claim 19 wherein:

said second control value is based on said yaw rate if a vehicle velocity is below a selected threshold;

said second control value is based on said at least one of a lateral velocity, a rate of lateral velocity, and a lateral acceleration of said vehicle if said vehicle velocity is above a selected threshold; otherwise said second control value is based on a combination of said yaw rate said at least one of a lateral velocity, a rate of lateral velocity, and a lateral acceleration of said vehicle.

22. The method of claim 17 wherein said computing a desired state for the vehicle is based on a magnitude of a lateral acceleration and at least one of a throttle command and a magnitude of a longitudinal acceleration.

23. The method of claim 17 wherein said desired state for the vehicle includes at least one of a desired yaw rate, a desired lateral velocity, a desired rate of lateral velocity, and a desired lateral acceleration for said vehicle.

24. The method of claim 17 wherein said first control value is based on at least one of a vehicle speed and a steering wheel position.

25. A method of controlling a steering system in a vehicle comprising:

computing a desired state of the vehicle;

computing a first control value based on said desired states of the vehicle and based on at least one of: a lateral velocity, a rate of lateral velocity, a lateral acceleration, and a combination, wherein said combination includes a yaw rate with at least one of a lateral velocity, a rate of lateral velocity, and a lateral acceleration of said vehicle;

affecting the vehicle based on said first control value; and wherein said computing a first control value includes a blended solution for said first control value based on a steering wheel frequency.

26. The method of claim 17 wherein:

said first control value is based on said yaw rate if a steering wheel frequency is below a selected threshold;

said first control value is based on said at least one of a lateral velocity, a rate of lateral velocity, and a lateral acceleration of said vehicle if said steering wheel frequency above a selected threshold; otherwise said first control value is based on a combination of said yaw rate said at least one of a lateral velocity, a rate of lateral velocity, and a lateral acceleration of said vehicle.

27. The method of claim 17 wherein said computing a first control valve includes a blended solution for said first control value based on a vehicle velocity.

28. A method of controlling a steering system in a vehicle comprising:

computing a desired state of the vehicle;

computing a first control value based on said desired states of the vehicle and based on at least one of: a lateral velocity, a rate of lateral velocity, a lateral acceleration, and a combination, wherein said combination includes a yaw rate with at least one of a lateral velocity, a rate of lateral velocity, and a lateral acceleration of said vehicle;

affecting the vehicle based on said first control value; and wherein:

said first control value is based on said yaw rate if a vehicle velocity is below a selected threshold;

said first control value is based on said at least one of a lateral velocity, a rate of lateral velocity, and a lateral acceleration of said vehicle if said vehicle velocity is above a selected threshold; otherwise said first control value is based on a combination of said yaw rate said at least one of a lateral velocity, a rate of lateral velocity, and a lateral acceleration of said vehicle.

29. The method of claim 19 wherein said second control value is based on an estimate of surface friction.

30. The method of claim 19 wherein at least one of said first control value and said second control value is based on a transfer function of order greater than two.

31. The method of claim 19 wherein said second control value is a function of proportional, derivative, and a windowed integrator terms.

32. The method of claim 17 wherein the vehicle is at least one of a rear wheel steering system and a front wheel steering system.

33. A control system for a steering system in a vehicle comprising:
- a means for computing a desired state of the vehicle based on tire relaxation;
- a means for computing a first control value based on said desired states of the vehicle and based on at least one of: a lateral velocity, a rate of lateral velocity, a lateral acceleration, and a combination, wherein said combination includes a yaw rate with at least one of a lateral velocity, a rate of lateral velocity, and a lateral acceleration of said vehicle;
- a means for affecting the vehicle based on said first control value.

34. A storage medium encoded with a machine-readable computer program code, said computer program code including instructions for causing controller to implement a method for controlling a steering system in a vehicle comprising:
- computing a desired state of the vehicle based on tire relaxation;
- computing a first control value based on said desired states of the vehicle and based on at least one of: a lateral velocity, a rate of lateral velocity, a lateral acceleration, and a combination wherein said combination includes a yaw rate with at least one of a lateral velocity, a rate of lateral velocity, and a lateral acceleration of said vehicle;
- affecting the vehicle based on said first control value.

35. A computer data signal, said data signal comprising code configured to cause a controller to implement a method for controlling a steering system in a vehicle comprising:
- computing a desired state of the vehicle based on tire relaxation;
- computing a first control value based on said desired states of the vehicle and based on at least one of: a lateral velocity, a rate of lateral velocity, a lateral acceleration, and a combination, wherein said combination includes a yaw rate with at least one of a lateral velocity, a rate of lateral velocity, and a lateral acceleration of said vehicle;
- affecting the vehicle based on said first control value.

* * * * *